United States Patent
Guimarães Coelho et al.

(10) Patent No.: US 12,529,015 B2
(45) Date of Patent: Jan. 20, 2026

(54) FABRIC ANTI-ODOUR AGENT, METHOD OF PRODUCTION AND USES THEREOF

(71) Applicants: CENTITVC—CENTRO DE NANOTECNOLOGIA E MATERIAIS TÉCNICOS FUNCIONAIS E INTELIGENTES, Vila Nova de Famalicão (PT); UNIVERSIDADE CATÓLICA PORTUGUESA, Oporto (PT); CITEVE—CENTRO TECNOLÓGICO DAS INDUSTRIAS TÊXTEIS E DO VESTUÁRIO DE PORTUGAL, Vila Nova de Famalicão (PT); RIOPELE—TÊXTEIS, SA, Pousada de Saramagos (PT)

(72) Inventors: Lorena Henrique Guimarães Coelho, Vila Nova de Famalicão (PT); Catarina Dias Da Costa, Vila Nova de Famalicão (PT); Nuno Gonçalo Azoia Lopes, Vila Nova de Famalicão (PT); Inês Marques Pinheiro, Vila Nova de Famalicão (PT); Ana Isabel Teixeira Ribeiro De Magalhães, Felgueiras (PT); Maria Manuela Estevez Pintado, Oporto (PT); Inês Gonçalves Valente Guimarães, Oporto (PT); Patrícia Sofia Pinhanços Batista, Oporto (PT); Ricardo Jorge Guedes Paiva Freixo, Oporto (PT); José De Almeida Morgado, Vila Nova de Famalicão (PT); Rosa Maria Gomes Esteves Da Silva, Vila Nova de Famalicão (PT); Albertina Maria Faria Reis, Guilhabreu (PT); Angela Cristina Rodrigues Castro Teles, Guimarães (PT); Marta Sofia Sousa Ribeiro Carvalho, Vila Nova de Famalicão (PT); Mario Rafael Silva Marques, Vila Nova de Famalicão (PT)

(73) Assignees: CENTITVC—CENTRO DE NANOTECNOLOGIA E MATERIAIS TÉCNICOS FUNCIONAIS E INTELIGENTES, Vila Nova de Famalicão (PT); UNIVERSIDADE CATÓLICA PORTUGUESA, Oporto (PT); CITEVE—CENTRO TECNOLÓGICO DAS INDUSTRIAS TÊXTEIS E DO VESTUÁRIO DE PORTUGAL, Vila Nova de Famalicão (PT); RIOPELE—TÊXTEIS, SA, Pousada de Saramagos (PT)

( * ) Notice: Subject to any disclaimer, the term of this patent is extended or adjusted under 35 U.S.C. 154(b) by 409 days.

(21) Appl. No.: 18/258,051

(22) PCT Filed: Dec. 20, 2021

(86) PCT No.: PCT/IB2021/062036
§ 371 (c)(1),
(2) Date: Jun. 16, 2023

(87) PCT Pub. No.: WO2022/130357
PCT Pub. Date: Jun. 23, 2022

(65) Prior Publication Data
US 2024/0034959 A1    Feb. 1, 2024

(30) Foreign Application Priority Data

Dec. 18, 2020  (PT) ........................................ 116959

(51) Int. Cl.
*C11D 3/00* (2006.01)
*C11D 3/384* (2006.01)

(52) U.S. Cl.
CPC ............ *C11D 3/384* (2013.01); *C11D 3/0068* (2013.01); *C11D 2111/12* (2024.01)

(58) Field of Classification Search
CPC ... C11D 3/384; C11D 3/0068; C11D 2111/12; C11D 3/0084; C11D 3/48; B01J 20/24; B01J 20/28026
(Continued)

(56) References Cited

U.S. PATENT DOCUMENTS

2018/0016737 A1*  1/2018  Cogniaux ........... D06M 13/188

FOREIGN PATENT DOCUMENTS

JP    2004026730 A    1/2004
JP    2015190069 A    11/2015
(Continued)

OTHER PUBLICATIONS

Industrial Crops and Products dated 11/205.*
(Continued)

Primary Examiner — Eisa B Elhilo
(74) Attorney, Agent, or Firm — Leason Ellis LLP

(57) ABSTRACT

The present disclosure relates to the use of whey protein as an anti-odour agent in a fabric, a textile finishing anti-odour (Continued)

method using whey proteins as an anti-odour agent, anti-odour compositions and anti-odour articles.

20 Claims, 11 Drawing Sheets

(58) Field of Classification Search
USPC .......................................................... 510/276
See application file for complete search history.

(56) References Cited

FOREIGN PATENT DOCUMENTS

| WO | 2019243425 A1 | 12/2019 |
|---|---|---|
| WO | 2020131879 A2 | 6/2020 |

OTHER PUBLICATIONS

Pisitsak P et al: "Improving the dyeability of cotton with tanninrich natural dye through pretreatment with whey protein isolate", Industrial Crops and Products, Nov. 2015, pp. 47-56.

Winbreck F et al: "Microencapsulation of oils using whey protein/gum Arabic coacen/ates", Journal of Microencapsulation, Sep. 2004, pp. 667-679.

Ferreira, "Desenvolvimento de têxteis sustentáveis com base na valorização de resíduos e subprodutos alimentares", Doctoral Dissertation, Oct. 2017 (135 pages).

Khouloud Fekih Ahmed et al., "Formation and characterization of chitosan-protein particles with fractal whey protein aggregates", Collids and Surfaces B: Biointerfaces, May 2018, pp. 257-264.

Lorena Coelho et al., "Innovation of Textiles through Natural By-Products and Wastes", Waste in Textile and Leather Sectors, Jun. 2020, pp. 1-26.

International Search Report and Written Opinion for corresponding PCT Application No. PCT/IB2021/062036 dated Apr. 29, 2022 (12 pages).

Rachel H. McQueen et al., "In vivo assessment of odour retention in an antimicrobial silver chloride-treated polyester textile", Journal of the Textile Institute, Jan. 2013, pp. 108-117.

Michael A. McGinley et al., "Methods for Odor Evaluation of Textiles and other Materials", AATCC Journal of Research, Mar. 2017 (17 pages).

\* cited by examiner

FABRIC ANTI-ODOUR AGENT, METHOD OF PRODUCTION AND USES THEREOF

CROSS-REFERENCE TO RELATED APPLICATIONS

This application is a U.S. National Stage Application under 35 U.S.C. § 371 of International Patent Application No. PCT/IB2021/062036, filed Dec. 20, 2021, which claims priority to Portugal Patent Application No. 116959, filed Dec. 18, 2020, the contents of which are each hereby incorporated by reference in their respective entireties.

TECHNICAL FIELD

The present disclosure relates to the use of whey protein as an anti-odour agent in a fabric, a textile finishing anti-odour method using whey proteins as an anti-odour agent, anti-odour compositions and anti-odour articles.

BACKGROUND

The major environmental problem with dairy by-products, mainly Whey, is the large amounts of organic compounds in its composition. The industry, together with the scientific community, soon realize that this problem could be turn into a solution, because it is possible to extract value added products from whey and other dairy industry by-products.

The dairy industry is characterized by a broad group of food products, such as milk, milk powder, butter, yoghurts, cream and cheese, but it is also a big source of solid and liquid by-products, but among those, whey is the one produced at the highest volumes in cheese industry. The world production of by-products in dairy industry is around 4-11 million tonnes per year, but Europe is the worldwide leader in cheese production and consequently the largest whey producer. This has a big environmental impact if they are disposed as wastes, so strategies to reuse these by-products are important, and there is a community pressure in this sense. Traditionally, some years ago, whey is used to be disposed of, but with environmental concerns and legislation to be implemented, the reuse appears with a prominent role. Whey is considered one of the major pollutant by-products because of its high biological and chemical oxygen demands. Whey proteins award health benefits such as high nutritional value, easy digestion, and assimilation, which are interesting for the food industry too. It can be used for biotransformation feeds, bioproteins, prebiotics, and bioactive peptides after fermentation or enzymatic hydrolysis. On the other hand, the reduced-lactose whey, demineralized whey, and whey protein concentrates, or isolates are used for food, cosmetic and pharmaceutical industries, especially for their emulsifying, thickening, gelling, foaming and water-binding properties. More specific, these proteins of natural origin and with emulsifying capacity are used in the formulation of creams and shampoos as substitutes for synthetic surfactants. The whey protein hydrolysate also has this type of application for hair products. Another property of whey protein consists of gel formation, being used to produce protective films and coatings.

In general, a person releases different compounds (such as sweat) and is surrounded by unpleasant odours (such as cigarette smoke). During use, these odours tend to be trapped in textile substrates, and its development may continue even after it is no longer in contact with the malodour source. On the other hand, there is evidence that laundering does not always completely remove odours, with odour potentially building up over time. In this sense, the market for functional textiles has been extended to apparel textiles to respond not only the aesthetic but also the functional needs. In order to avoid the accumulation and perception of the malodour, the capacity to interact and neutralize odour is a property of increasing interest in substrates for various applications.

These facts are disclosed in order to illustrate the technical problem addressed by the present disclosure.

GENERAL DESCRIPTION

The present disclosure relates to the use of whey protein as an anti-odour agent in a fabric, a textile finishing anti-odour method using whey proteins as an anti-odour agent, anti-odour compositions and anti-odour articles. Surprisingly, the anti-odour capacity of whey protein or of a whey protein is maintain in the fabric after several washing cycle, preferably at least after 5 washing cycles, preferably after at least 10 washing cycles, preferably after at least 15 washing cycles.

In general, people release different compounds (such as sweat) and is surrounded by unpleasant odours (such as cigarette smoke). These odours tend to be trapped in textiles, solutions that prevent trapped of said unpleasant odours are widely investigated. The present disclosure relates to the used of whey proteins as an anti-odour agent that is able to bind to a fabric and solve this problem.

Milk is composed of two proteins, casein and whey with 80 and 20% of proportion, respectively. Whey protein can be separated from the casein in milk or formed as a by-product of cheese making. Then, whey is the liquid part of milk which contain a mixture of proteins isolated (β-lactoglobulin, α-lactalbumin, glycomacropeptide, immunoglobulins, bovine serum albumin, lactoferrin, lactoperoxidase and lysozyme).

Whey proteins powders are highly soluble due to the low molecular weight and globular structure of the predominant and its main constituents' proteins, i.e., β-lactoglobulin and α-lactalbumin. Whey protein is available in different types, depending on the milk coagulate process, resulting in sweet or acid whey, as well as the purification treatment carried out and the respective protein concentration, which can be classified as lactose-rich whey, concentrated whey and isolated whey.

Whey proteins can be used in its native/folded form, without any previous treatment, or it can be previously treated and used in its denatured/unfolded form, by heat to alter their functional properties and its structural conformation (FIG. 4). Whey proteins can also be used as an encapsulating material or entrapped material of active ingredients and other molecules that increase its intrinsic value.

In the present disclosure, whey proteins were used in their native, denatured form and as an encapsulating material of active ingredients for textile finishing using different binders (glutaraldehyde, glyoxal, carboxylic acids, polyurethane resins, acrylic resin, among others). Textile substrates of varying composition (cotton, polyester, viscose, elastane, polyamide, lyocell, among others) have been functionalized by conventional finishing technologies (padding, exhaustion, spray coating, doctor blade, screen printing or other textile finishing techniques, including the coatings of yarns).

An aspect of the present disclosure relates the composition for functionalized a fabric substrate comprising a whey protein and/or a whey protein fraction as a deodorant agent or as deodorizer agent bound to the fabric substrate.

An aspect of the present disclosure composition for functionalized a fabric substrate comprising a whey protein, a whey protein fraction and/or a denatured whey protein; as a deodorant agent or as deodorizer agent bound to the fabric substrate; provided that if the composition comprises whey protein and/or a whey protein fraction a suitable binder is present.

In an embodiment, the whey protein is a whey protein isolate, whey protein concentrate, or mixtures thereof.

In an embodiment, the composition of the present disclosure may further comprise a suitable binder, an active substance, or mixtures thereof.

In an embodiment, the active substance is selected from a list consisting of chitosan, vitamins, essential oils, fragrances, additives, functional additives, or mixtures thereof.

In an embodiment, the weight ratio between active substance and the whey protein and/or the whey protein fraction ranges from 1:1-12:1; preferably 2:1-10:1; more preferably 5:1-8:1 (FIG. 5).

In an embodiment, the whey protein and/or the whey protein fraction and the active substance form particle aggregates.

In an embodiment, the size of each particle aggregate ranges from 100-400 nm, preferably from 200-350 nm, more preferably 150-250 nm. The size of the particle aggregate is calculated by using a Dynamic Light Scattering (DLS) apparatus and the software Zetasizer from Malvern.

The presence of chitosan in each particle aggregate was determined by zeta potential evaluation—as higher is the obtained value higher is the percentage of active agent in the particle. In an embodiment, the potential zeta ranges from 10-50, preferably from 10-35, more preferably 10-20, regarding WPC:Chitosan (FIG. 6).

In an embodiment, the binder selected from the following list polyurethane resin, glutaraldehyde, acrylic resin, glioxal, carboxylic acid, or mixtures thereof, wherein said binder bound the whey protein to the fabric substrate.

In an embodiment, the composition of the present disclosure may further comprise a dye, a thickener, a softener, an essential oil, or combinations thereof.

Another aspect of the present disclosure relates to a fabric comprising the composition described in the present subject matter.

In an embodiment, the amount of whey protein and/or a whey protein fraction per $cm^2$ of fabric ranges from 0.2-3 $mg/cm^2$; preferably 0.3-1.5 $mg/cm^2$, more preferably 0.5-0.9 $mg/cm^2$.

In an embodiment, said fabric may be a woven fabric, a non-woven fabric, a yarn, or a combination.

In an embodiment, the textile fibre is selected from a list consisting of: cotton, polyester, polyamide, viscose, elastane, lyocell or mixture thereof.

Another aspect of the present disclosure relates to an article comprising the composition, or the fabric described in the present disclosure. Namely a piece of clothing, more preferably a shirt, a t-shirt, a dress, among others.

Another aspect of the present disclosure relates to the use of a whey protein and/or a whey protein fraction as a deodorant agent or as deodorizer agent in a fabric, in particular in a textile substrate. Preferably, wherein said fabric is a woven fabric, a non-woven fabric, one or more yarns, fibres or combinations thereof.

In an embodiment, the whey protein and/or a whey protein fraction can also be used as an antimicrobial agent, as an antioxidant agent and as a pre-biotic agent.

Use of the composition described in the present disclosure as a deodorant agent or as deodorizer agent or as a deodorant agent, and further in same applications as an antioxidant agent, as an antimicrobial agent and as a pre-biotic agent Method for producing a fabric comprising the composition described in the present disclosure wherein the composition is applied on a fabric substrate by at least one process step of: padding, exhaustion, spray coating, doctor blade, screen printing, among others.

In an embodiment, it was possible to observe that the finish showed high performance in regarding the deodorant properties, demonstrating the ability to interact for different odorous markers for the effect (acetic acid, isovaleric acid, guaiacol, nonanal, nonenal, indole, 3-Methyl-2-hexenoic acid, 3-hydroxy-3-methylhexanoic acid, among others).

Additionally, textile substrates functionalized with whey proteins demonstrated good deodorant properties maintaining other technical whey functionalities, such antioxidant activity, prebiotic activity and antimicrobial activity.

BRIEF DESCRIPTION OF THE DRAWINGS

The following figures provide preferred embodiments for illustrating the disclosure and should not be seen as limiting the scope of invention.

DETAILED DESCRIPTION

The present disclosure relates to the use of whey protein as an anti-odour agent in a fabric, a textile finishing anti-odour method using whey proteins as an anti-odour agent, anti-odour compositions and anti-odour articles.

The present subject-matter discloses an all-green textile finishing anti-odour technology using whey proteins.
Anti-Odour Properties Evaluation In an embodiment, the capacity to interact and/or neutralize odour is a property that is objectively determined by using ISO 17299:2014 standard method, using the gas chromatography with flame ionization detector (GC-FID) technique—R. H. McQueen, M. Keelan, Y. Xu and T. Mah, Journal of the Textile Institute, 104:1 (2013), 108-117; and ISO 17299-1 (2014). Most odour-related studies include testing with a sensory evaluation panel, since the broadest and most sensitive odour detector is undoubtedly the mammalian olfactory system. This methodology combined with an instrumental method, becomes an ideal method for both internal and external odour analysis (M. A., Mcginley and C. M. Mcginley, AATCC Journal of Research, (2017), 1-17).

Figure 1:
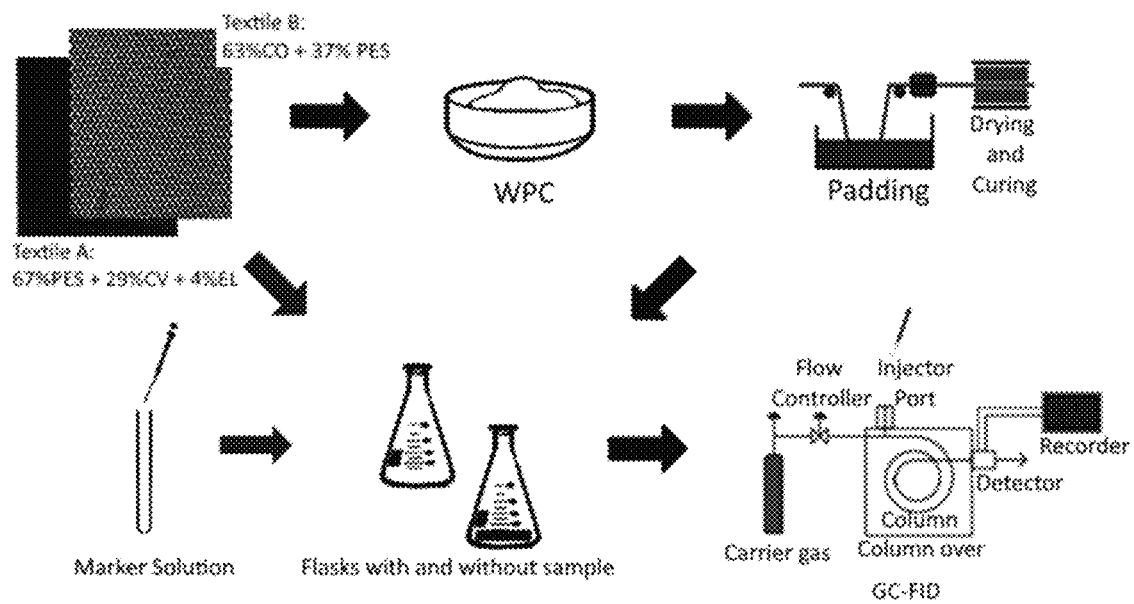
FIG. 1: Schematic representation of textiles preparation comprising the composition of the present disclosure and the adapted procedure based on the standard ISO 17299-3 (2014).

In an embodiment, FIG. 1 shows the adapted procedure of the odour reduction rate evaluation based on ISO 17299:2014 using GC-FID technique. The odour reduction rate (ORR) can be calculated using, the standard ISO 17299-3 (2014), Textiles—Determination of deodorant property: Gas chromatography method, Switzerland:

$$OOR = (Sb - Sm)/Sb * 100$$

where Sm is the average peak area of FID of the testing gas with a specimen; Sb is the average peak area of the testing was without specimen. According to the standard, and for IVA marker, a reduction capacity of ≥85% is required for a textile to be considered deodorant.

In an embodiment, two different substrates were analysed, textile A (67% PES+29% CV+4% EL) and textile B (63% CO+37% PES). The textile A was used as a positive control, as it already has intrinsically great interaction with the odour marker IVA, and textile B for having greater potential for improvement. In this sense, textile B was analyzed as control and functionalized with 7.5% of WPC by padding technique.

The reduction rate for IVA marker were analysed following ISO 17299-3:2014. In addition, a sensory analysis was performed with 19 volunteers for the same odoriferous marker, to qualify the odour felt and correlate with the results obtained by GC-FID technique.

Figure 2:
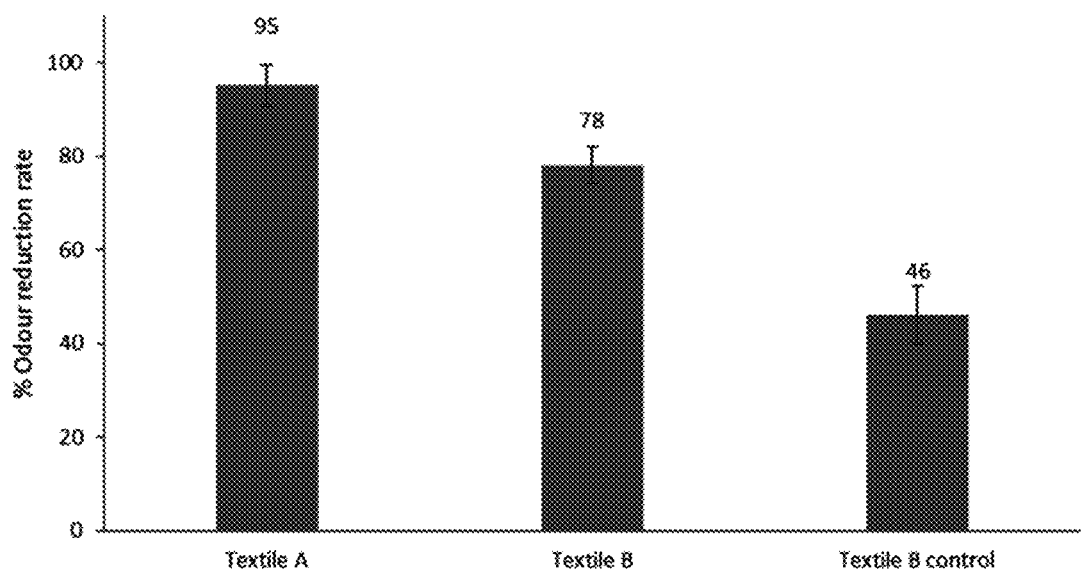
FIG. 2: Schematic representation of assessment of IVA odour reduction rate capacity by textile substrates using the GC-FID technique.

In an embodiment, FIG. 2 shows that only the textile A can be considered as such (95% of reduction). Although, the functional textile B (78% of reduction) demonstrated a high ability to reduce IVA odour and improvement compared to the substrate control (45% of reduction achieved).

Figure 3:
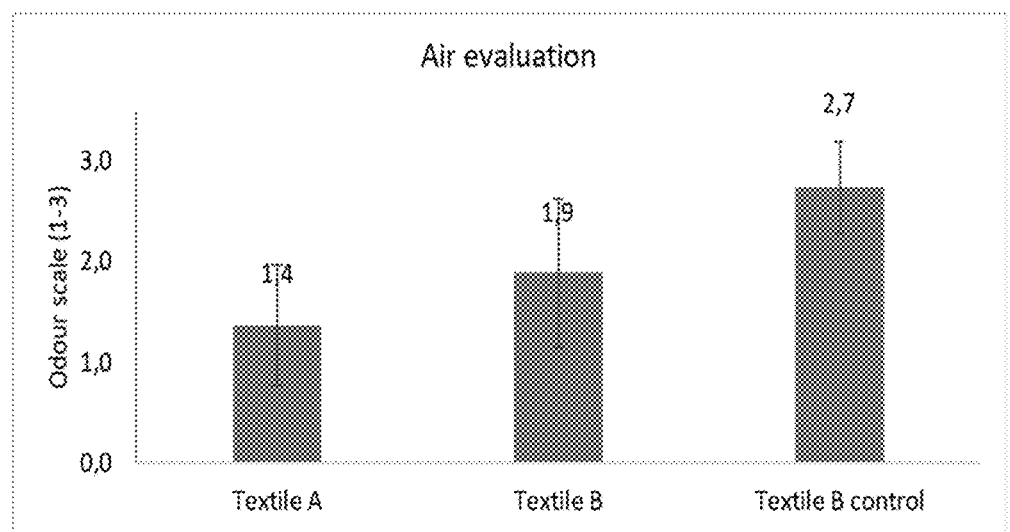
FIG. 3: Schematic representation of evaluation of odoriferous atmosphere flasks through sensory evaluation panel/volunteers.

Since a greater ability to reduce an odour by a textile decreases the odour present in the atmosphere, it was possible corroborate the results of sensory analysis of the FIG. 3 with the results obtained by GC-FID of the FIG. 2. The volunteers were able to distinguish and considered that the less intense atmosphere is that of textile A, followed by the functional textile B and control textile B. Statistically (Table 1), by Friedman's test using the Newell and MacFarlane table (Table 2) for a 95% probability, it is further found that there are no significant differences between textile A and functional textile B.

TABLE 1

Statistical analysis of results obtained by sensory evaluation

| Samples | 1 - Textile A | 2 - Textile B | 3 - Textile B control |
|---|---|---|---|
| Sum | 26 | 36 | 52 |
| Difference versus 1 | — | 10 | 26 |
| Difference versus 2 | — | — | 16 |

TABLE 2

Critical values for comparison with the modules of the differences between the orders sums of the ordination teste at 5 and 1% significance

| Number of judgments | Significance Level (%) | 3 | 4 | 5 | 6 | 7 | ... |
|---|---|---|---|---|---|---|---|
| 19 | 5 | | 15 | 21 | 27 | 33 | 40 | ... |
| | 1 | | 18 | 25 | 32 | 39 | 46 | ... |

Denaturation Process of Whey Proteins

Figure 4:
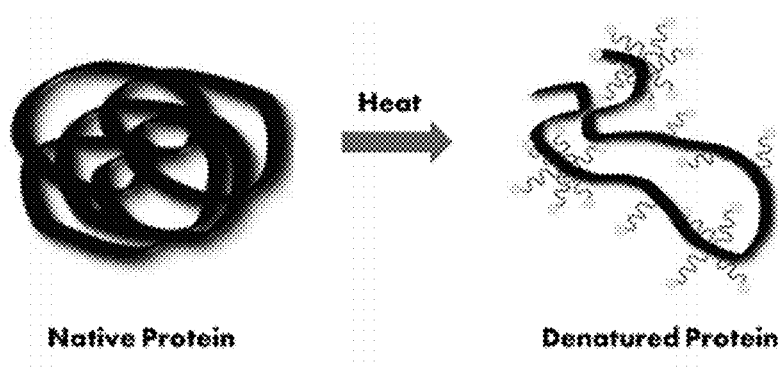
FIG. 4: Schematic representation of the structure of native and denatured protein.

In an embodiment, whey protein powders are highly soluble due to the low molecular weight and globular structure of the predominant proteins, i.e., β-lactoglobulin and α-lactalbumin. Whey proteins can be denatured by heat to alter their functional properties and its structural conformation (FIG. 4). A combination of time and temperature is used to control the amount of whey protein denaturation. Denatured protein interacts differently with water and other components than protein in its native state since the whey protein conformation and functionality are interrelated and dictated by changes in their globular folded structure.

Method A

In a laboratorial embodiment, the suspension of folded proteins was prepared by slowly dissolving WPC (whey protein concentrate) in water under magnetic stirring at room temperature until complete dissolution. The suspension of unfolded/denatured proteins was obtained from the folded protein suspension: first, pH was corrected by adding 8% (v/v) NaOH 0.1M relative to the total volume of the suspension, then the suspension was gradually heated in a thermostatic bath until it reached a final temperature of 85° C. and finally cooled down to room temperature.

Method B

In a laboratorial embodiment, the suspension of folded proteins was prepared by slowly dissolving WPC (whey protein concentrate) in water under magnetic stirring at room temperature until complete dissolution. The suspension of unfolded/denatured proteins was obtained from the folded protein suspension: first, pH was corrected by adding 8% (v/v) NaOH 0.1M relative to the total volume of the suspension, then the suspension was gradually heated in heating plate with 85° C. of final temperature set-point and finally cooled down to room temperature.

Method C

In an industrial embodiment, the suspension of folded proteins (10 wt %) was prepared by slowly dissolving WPC (whey protein concentrate) in water at room temperature until complete dissolution. The suspension of unfolded/denatured proteins was obtained from the folded protein suspension: first, pH was corrected by adding 8% (v/v) NaOH 0.1M relative to the total volume of the suspension. Then the suspension was gradually heated until 85° C. (coil heating feed by steam stream/steam flow) and finally cooled down to room temperature.

Microparticle Preparation Process

In an embodiment, protein microcapsules of WPC containing chitosan (an active agent to enhance antibacterial performance) were prepared. In this case, WPC stock solutions were prepared with 0.02% sodium azide, kept at 4° C. overnight. This procedure has the advantage of allowing complete hydration of the protein. A chitosan solution at 1% (m/v) (ChitoClear Primex) in 1% (v/v) acetic acid was also prepared. After adding 7.5% WPC and 0.75% chitosan, in a 1:10 ratio (v/v), vegetable oil was added in a concentration of 1% of total volume. Vegetable oil helps to maintain stability and emulsify. The mixtures were submitted to ultrasonication (US), at 20 kHz, with a wave amplitude equal to 57 µm and a 22 mm diameter probe. The sonication time is 15 minutes, in an ice bath.

In as industrial embodiment, for tests at the industrial level, the microparticles were scaled up, adapting the procedure used at the laboratory level. In this case, batches of 7.5% WPC formulation, 0.75% chitosan and vegetable oil were prepared and submitted to ultrasonication, using a BS2d40 probe with 40 mm of diameter and a booster, generating an amplitude of 26 µm ($40/cm^2$), with a power of 5000 W. The WPC, oil and chitosan solution, stored in a separate refrigerated reservoir (flow reactor), was recirculated to the reactor at a flow rate of 2 L/min, using a peristatic pump. A flow reactor was designed, specifically designed for ultrasonication, ensuring that temperature not exceed 25° C.

Figure 5:
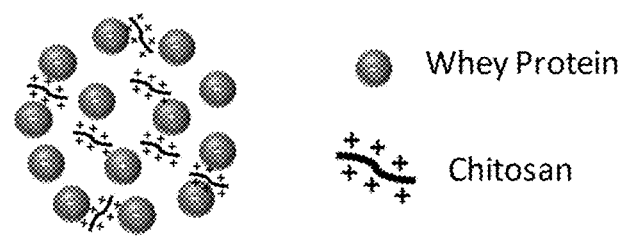
FIG. 5: Schematic representation of the combination mechanism between whey protein and a bioactive agent.
Figure 6:
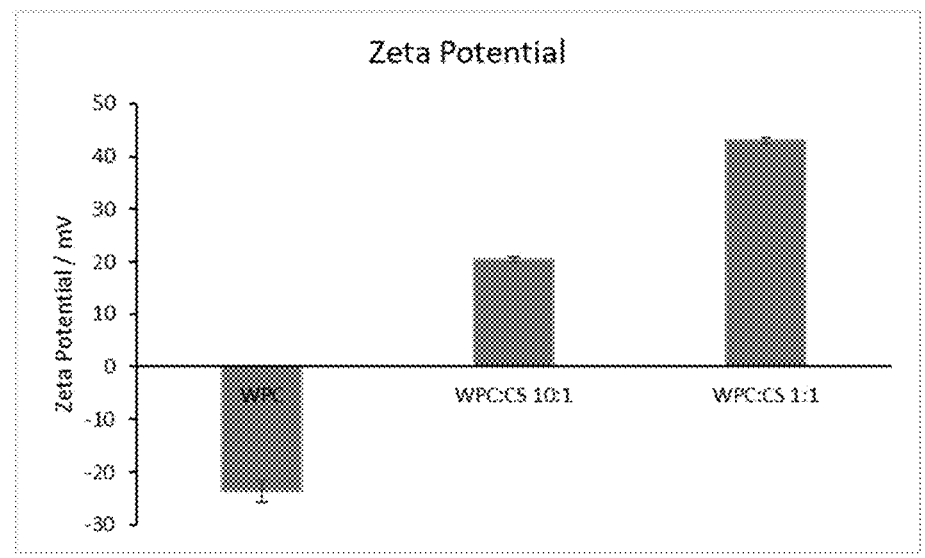
FIG. 6: Schematic representation for the evaluation of zeta potential on WPC microparticles solutions.

In an embodiment, the obtained nanoparticles were characterized the size (mean diameter, <DH>), and zeta (f) potential of the formulations were measured with a Malvern ZetaSizer Nano ZS, at 25° C. Disposable polystyrene cuvettes for size measurements and U-shaped zeta potential cuvettes were used. Both for DLS and zeta potential measurements a minimum of 5 repeats per sample were performed. In an embodiment, in terms of size, the microparticles have sizes between 200 and 350 nm, with a polydispersity index of less than 0.5. Regarding the zeta potential, at pH between 4 and 7, protein charge is negative. However, when chitosan is added, this charge reverses to positive, since the chitosan is positively charged. The zeta potential increases as the amount of chitosan also increases (FIG. 5). Since whey protein powder have a globular structure of the predominant proteins and has a negative charge and chitosan have a linear structure and has a positive charge, the aggregation mechanism may happen by electrostatic attraction, forming a complex aggregate between the protein and the polymer (FIG. 6). This mechanism is enhanced by the fact that chitosan is insoluble in water and will tend to be located inside the hydrophobic cavities of whey proteins, when in aqueous solution.

Formulation and Textile Functionalization

In an embodiment, a textile with 63% CO+37% PES composition was impregnated with whey protein concentrate at 7.5 wt % and glutaraldehyde (GA) 3 vol %, by pad-dry-cure technique. The textiles samples were dried at 100° C. for 2 minutes and cured at 120° C. for 2 minutes.

Figure 7:
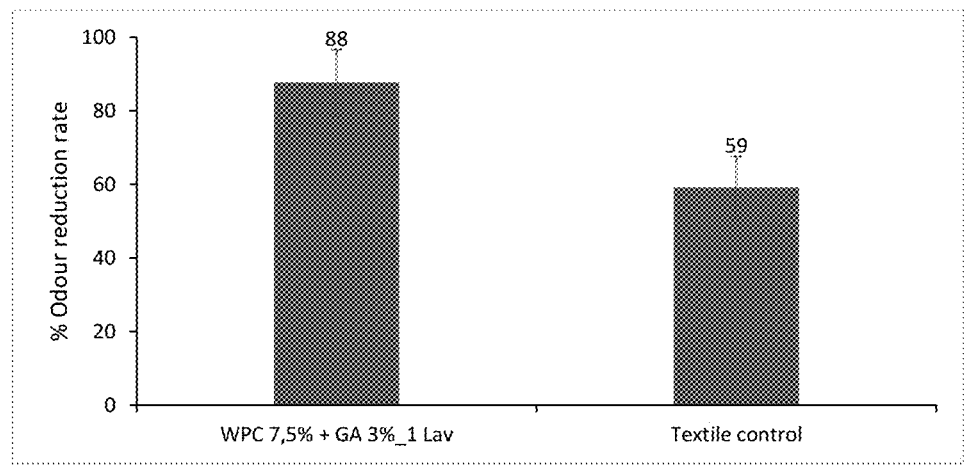
FIG. 7: Schematic representation of odour reduction rate characterization for IVA after 1 washing cycle with a reference detergent.

In an embodiment, FIG. 7 shows the GC-FID characterization for isovaleric acid (IVA) marker according ISO 17299-3:2014 adaptation after 1 washing cycle (WC), 1 h at 40° C., with a reference detergent in a domestic laundry machine. It is possible to observe that whey protein increases the interaction between the textile and IVA marker, demonstrating deodorant properties.

In an embodiment, a textile with 63% CO+37% PES composition was impregnated with whey protein concentrate denatured at 7.5 wt % by pad-dry-cure technique without binder. The textiles samples were dried at 100° C. for 2 minutes.

Figure 8:
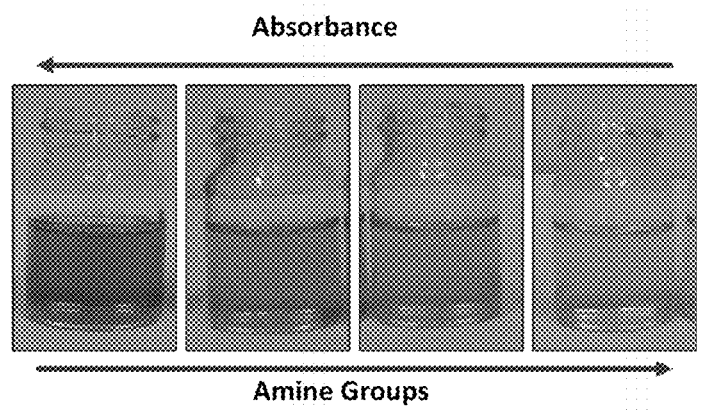
FIG. 8: Schematic representation of the colorimetric method Acid Orange.

Protein quantification trough a colorimetric method Acid Orange was performed. The interaction between the dye Acid Orange and the functionalized surface allows determine the concentration of amine groups on surface of the textile. Then, and since proteins have amine groups in their composition, the lower the Abs value, the greater the amount of protein present in the textile (FIG. 8).

Figure 9:
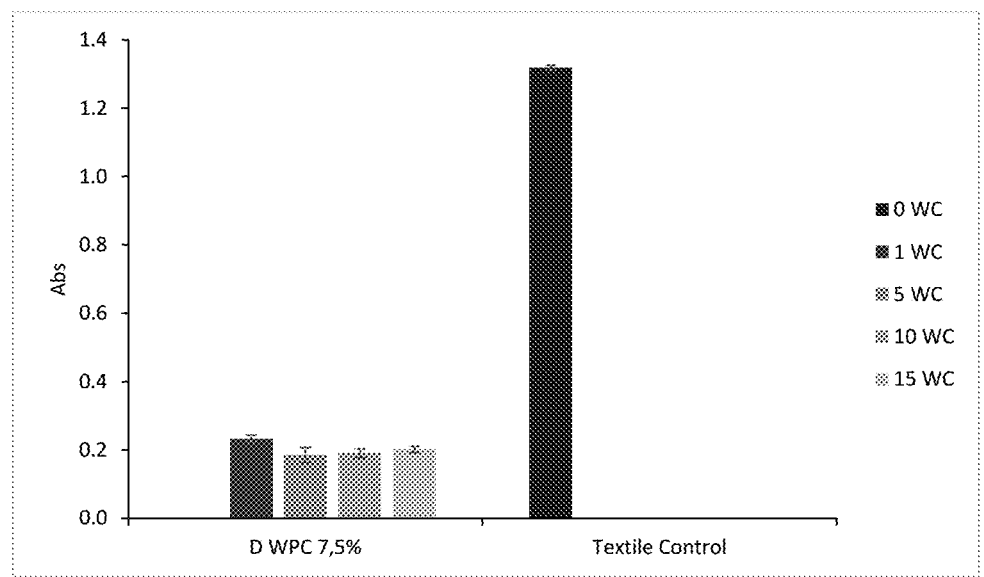
FIG. 9: Schematic representation of protein quantification by Acid Orange method after washing cycles with a reference detergent.

Protein quantification trough the colorimetric method Acid Orange was performed after 15 washing cycles (WC), with a reference detergent in a domestic laundry machine. The finishing on the textiles presents wash fastness up to 15 cycles, according FIG. 9.

Figure 10:
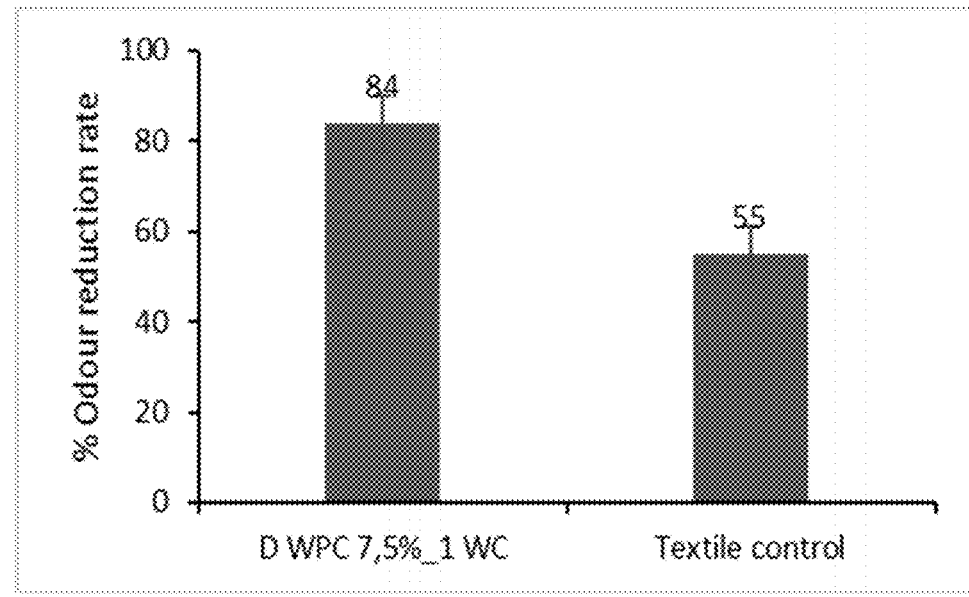
FIG. 10: Schematic representation of odour reduction rate characterization for IVA after 1 washing cycle with a reference detergent.

In an embodiment, FIG. 10 shows the GC-FID characterization for isovaleric acid (IVA) marker according ISO 17299-3:2014 adaptation after 1 washing cycle (WC), 1 h at 40° C., with a reference detergent in a domestic laundry machine. It is possible to observe that whey protein increases the interaction between the textile and IVA marker, and since the finish has wash fastness up to 15 cycles (similar Abs throughout the washing cycles), it can be concluded that the finish maintains the same performance.

In an embodiment, a textile with 63% CO+37% PES composition was impregnated with whey protein (WPC) concentrate denatured at 7.5 wt % and glutaraldehyde (GA) 5 vol %, by pad-dry-cure technique. The GA was used as a crosslinker between the WPC and the textile substrate. The textiles samples were dried at 100° C. for 2 minutes and cured at 130° C. for 2 minutes.

Figure 11:
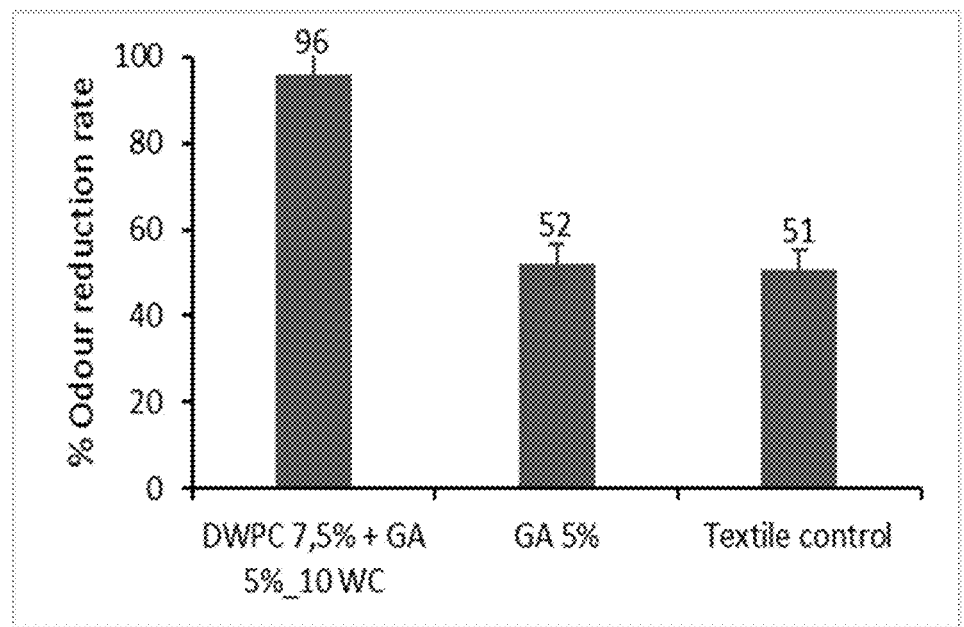
FIG. 11: Schematic representation of odour reduction rate characterization for IVA after 10 washing cycles with a reference detergent.

FIG. 11 shows the GC-FID characterization for isovaleric acid (IVA) marker according ISO 17299-3:2014 adaptation after 10 washing cycles (WC), 1 h at 40° C., with a reference detergent in a domestic laundry machine. It is possible to observe that whey protein increases the interaction between the textile and IVA, increasing the odour reduction rate, demonstrating deodorant properties, and wash fastness up to 10 cycles.

Figure 12:
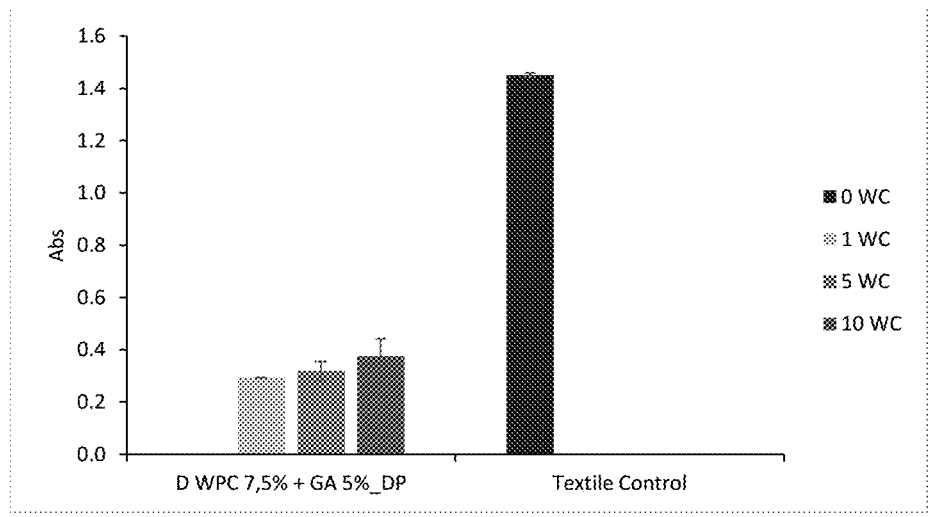
FIG. 12: Schematic representation of protein quantification by Acid Orange method after 10 washing cycles with two different reference detergents.

Protein quantification trough the colorimetric method Acid Orange was performed after 10 washing cycles (WC), with two reference detergents in a domestic laundry machine. The finishing on the textiles presents wash fastness up to 10 cycles, according FIG. 12.

In a laboratorial embodiment, a textile with 63% CO+37% PES composition was impregnated with whey protein concentrate denatured at 9 wt % and a polyurethane resin (B1—binder) at 2 wt %, by pad-dry-cure technique. The textiles samples were dried at 100° C. for 2 minutes and cured at 160° C. for 2 minutes.

Figure 13:
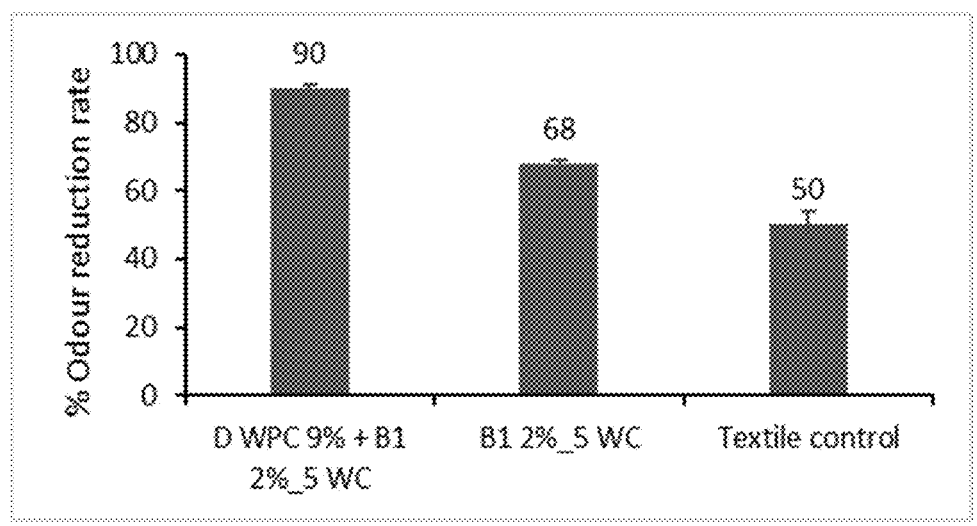
FIG. 13: Schematic representation of odour reduction rate characterization for IVA after 5 washing cycles with a reference detergent.

FIG. 13 shows the GC-FID characterization for isovaleric acid (IVA) marker according ISO 17299-3:2014 adaptation after 5 washing cycle (WC), 1 h at 40° C., with a reference detergent in a domestic laundry machine. Textile samples with WPC show high interaction for the IVA marker, with high odour reduction rate, demonstrating deodorant properties. Although the polyurethane resin binder interacts with IVA marker, whey protein significantly increases the interaction between the textile control and binder B1. The finishing on the textiles demonstrated deodorant properties and wash fastness up to 5 cycles.

The antioxidant activity was performed through the ABTS radical method. The ABTS assay is a colorimetric method based on the ABTS cation radical formation. This radical, which is dark green in colour, can react strongly with hydrogen donor compounds, such as phenolic compounds, being converted into a non-coloured form of ABTS. This method consists of spectrophotometric analysis of the oxidation activity of the cationic radical ($ABTS^{·+}$). This radical can be produced by the reaction in aqueous solution between ABTS (2,2'-azinobis (3-ethylbenzothiazoline-6-sulfonic acid)) and potassium persulfate, resulting in a blue-green solution. The addition of substances with antioxidant power to $ABTS^{·+}$ (that is, hydrogen donor compounds, such as phenolics) causes a structural change that results in discoloration and loss of the ability to absorb in that wavelength.

Figure 14:
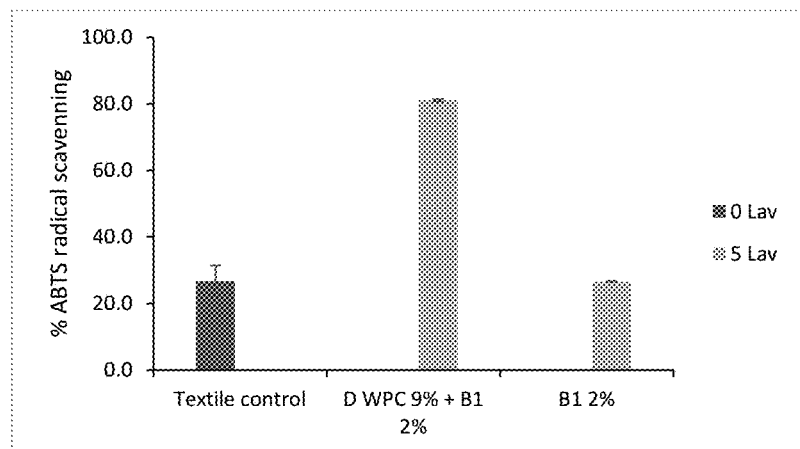
FIG. 14: Schematic representation of radical ABTS scavenging after 5 washing cycles with a reference detergent.

FIG. 14 shows the percentage of inhibition of the $ABTS^{·+}$ radical for the textile control textile, functionalized with denatured protein and binder and functionalized only with binder. The results demonstrate that the sample with denatured protein show a high percentage of radical reduction, when compared to the control textile and binder, indicating an antioxidant activity.

In an embodiment, a textile with 63% CO+37% PES composition was impregnated by pad-dry-cure technique with whey protein concentrate denatured at 9 wt % and two polyurethane resins: B1 at 2 wt % and B2 at 4 wt %. The textiles samples were dried at 100° C. for 2 minutes and cured at 160° C. for 2 minutes.

Figure 15:
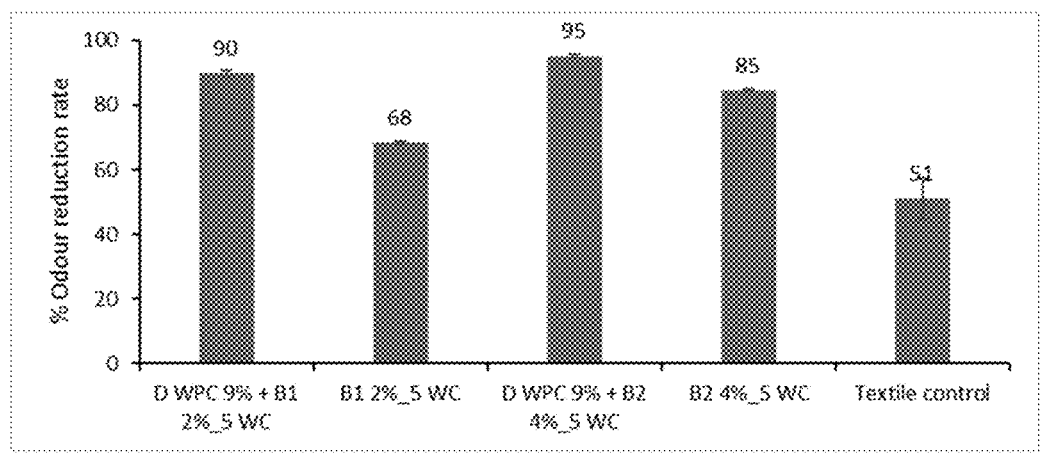
FIG. 15: Schematic representation of odour reduction rate characterization for IVA after 5 washing cycles with a reference detergent.

GC-FID characterization for isovaleric acid (IVA) according ISO 17299-3:2014 adaptation was performed after 5 washing cycle (WC), 1 h at 40° C., with a reference detergent in a domestic laundry machine. It was possible to observe in FIG. 15 that, although the polyurethane binders interact with IVA marker, whey protein significantly increases the interaction between the textile control and booth binder B1 and B2. Textile samples with WPC show high interaction for the marker after 5 washing cycles, with high odour reduction rate compare the textile control, demonstrating deodorant properties.

Figure 16:
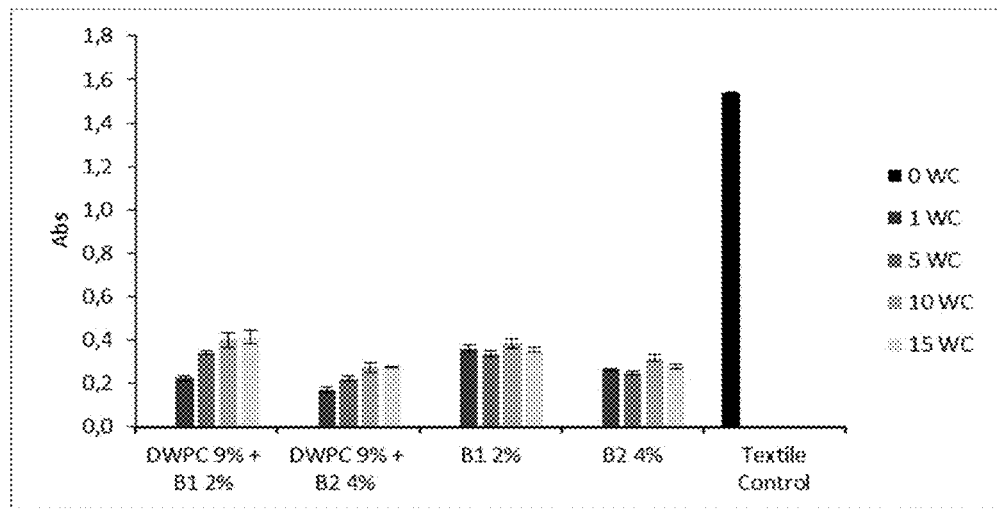
FIG. 16: Schematic representation of protein quantification by Acid Orange method after 15 washing cycles with a reference detergent.

Protein quantification trough the colorimetric method Acid Orange was performed after 15 washing cycles (WC) with a reference detergent (1 h at 40° C.) in a domestic laundry machine. The lower the Abs value, the greater the amount of amine groups in the substrate. Results present in FIG. 16 demonstrates the interaction between not only of whey protein, but also for the binders B1 and B2 with the Acid Orange marker. It is possible observe wash fastness of the finishing on the textile since, lower the Abs value, the greater the amount of protein and binder present in the textile. The increase observed with the washing cycles is not significant when compared to the value of the control textile. In addition, the results in FIG. 15 prove the presence of the protein in the textile substrate due to the high odour reduction rate obtained, being superior to the sample only with binder B1 and B2.

In an embodiment, a comparison of whey protein concentrate native and denatured at 9 wt % was made. The proteins were impregnated in a textile with 63% CO+37% PES composition by pad-dry-cure technique with a polyurethane resin (B1) at 2 wt %. The samples were dried at 100° C. for 2 minutes and cured at 160° C. for 2 minutes.

Figure 17:
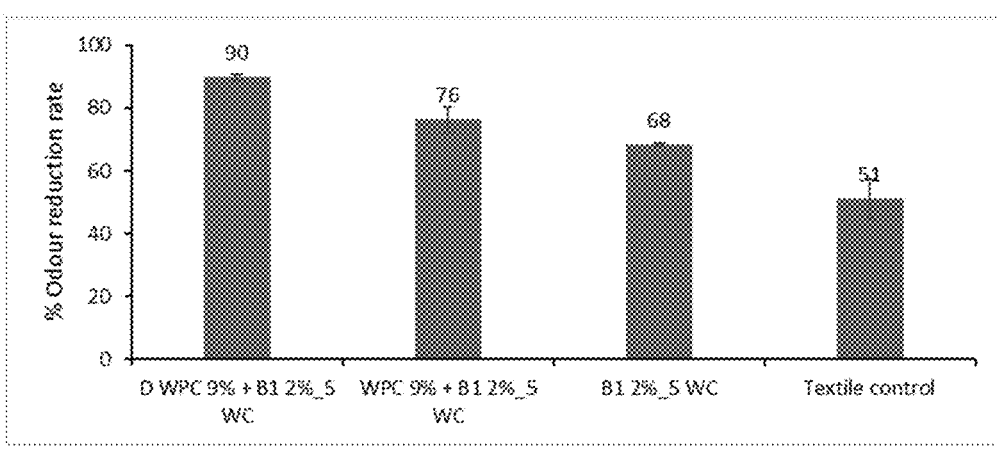
FIG. 17: Schematic representation of odour reduction rate characterization for IVA after 5 washing cycles with a reference detergent.

FIG. 17 shows GC-FID characterization for isovaleric acid (IVA) according ISO 17299-3:2014 adaptation after 5 washing cycle (WC) with a reference detergent (1 h at ° C.) in a domestic laundry machine. It was possible to observe that the odour reduction rate for the textiles finished with denatured whey protein is higher when compared with the native whey protein and the textile control and with the binder (B1).

Figure 18:
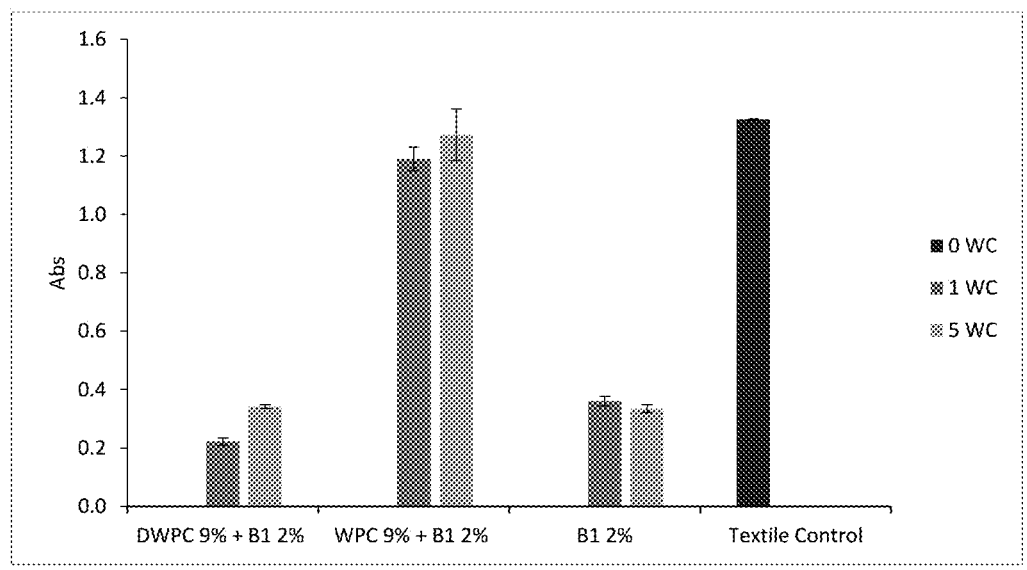
FIG. 18: Schematic representation of protein quantification by Acid Orange method after 5 washing cycles with a reference detergent.

Protein quantification trough a colorimetric method Acid Orange was performed after 5 washing cycles (WC) with a reference detergent (1 h at 40° C.) in a domestic laundry machine. The lower the Abs value, the greater the amount of amine groups in the substrate. Results present in FIG. 18 demonstrates the interaction between not only of whey protein, but also for the binder with the Acid Orange marker. It is possible observe wash fastness of the finishing on the textile since, lower the Abs value, the greater the amount of protein and binder present in the textile. However, the Abs value for the denatured whey protein samples is significantly lower when compared to the native whey protein samples and the increase observed with the washing cycles is not significant when compared to the value of the control textile. In addition, the results in FIG. 17 prove the presence of the protein in the textile substrate due to the high odour reduction rate obtained, being superior to the sample with native whey protein and only with binder B1.

In an embodiment, a textile with 63% CO+37% PES composition was impregnated by pad-dry-cure technique with microparticles prepared with chitosan and glutaraldehyde (GA) 5 vol % as a binder. The samples were dried at 100° C. for 2 minutes and cured at 130° C. for 2 minutes.

Figure 19:
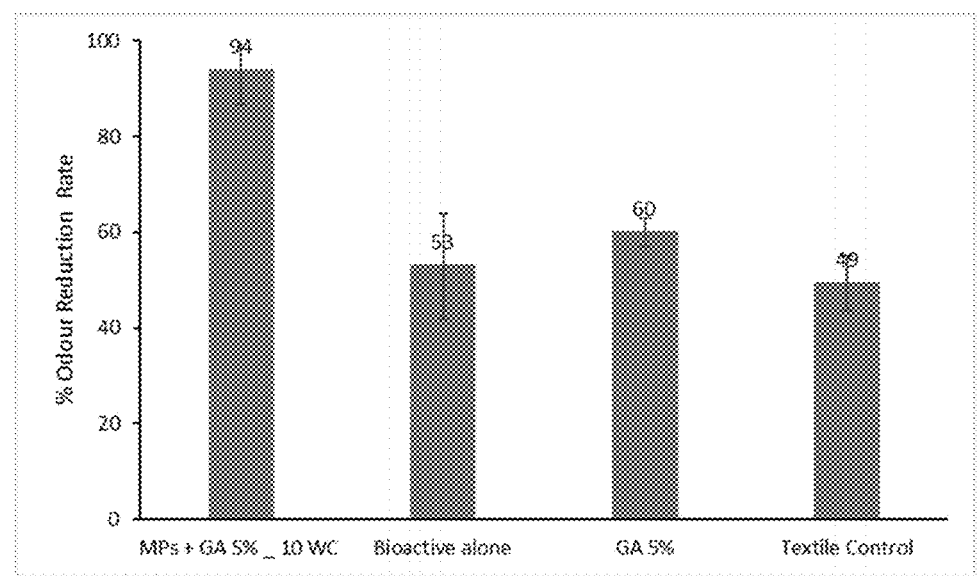
FIG. 19: Schematic representation of odour reduction rate characterization for IVA after 10 washing cycles with a reference detergent.

FIG. 19 shows GC-FID characterization for isovaleric acid (IVA) according ISO 17299-3:2014 adaptation after 10 washing cycle (WC) with a reference detergent (1 h at 40° C.) in a domestic laundry machine. The results demonstrate the wash fastness of the finishing on the textile samples up to 10 washing cycles and a higher odour reduction rate, demonstrating deodorant properties.

In order to evaluate the antimicrobial effect of the fabrics, they were subjected to the test according to the standard ISO 20743—Textiles—Determination of antibacterial activity of antibacterial finished products after one washing cycle with a reference detergent, for the bacteria responsible for the degradation of sweat in compounds with unpleasant odours (*S. Hominis* and *S. epidermidis*) and two of the bacteria referred to in the standard (*S. Aureus* and *P. innocua*). The textiles show ability to inhibit growth of *S. hominis, S. epidermidis* and *P. innocua*, after 24 hours (Table 1).

TABLE 3

Determination of antibacterial activity of antibacterial (Δlog UFC/ml growth between 0 H and 24 H) finished products after one washing cycle.

| Strain/Sample | Textile Control | Textile functionalized with WPC microparticles |
|---|---|---|
| S. aureus | 5.39 | 6.33 |
| S. epidermidis | 4.31 | 6.39 |
| S. hominis | 2.74 | 0.4 |
| P. Innocua | 9.90 | 6.39 |

In an embodiment, a textile with 63% CO+37% PES composition was impregnated by pad-dry-cure technique with microparticles, prepared with chitosan, and a polyurethane resin (B1) at 2 wt %. The samples were dried at 100° C. for 2 minutes and cured at 130° C. for 2 minutes.

Figure 20:
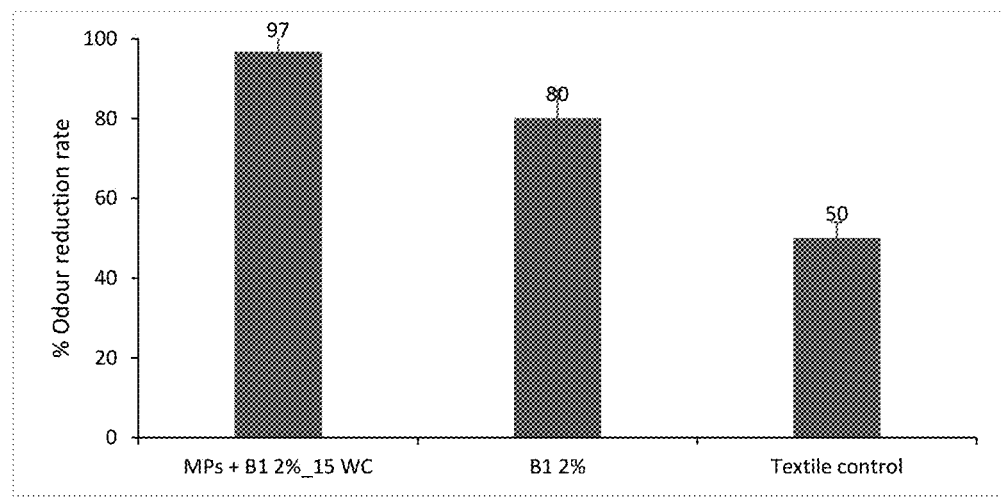
FIG. 20: Schematic representation of odour reduction rate characterization for IVA after 15 washing cycles with a reference detergent.

FIG. 20 shows GC-FID characterization for isovaleric acid (IVA) according ISO 17299-3:2014 adaptation after 15 washing cycle (WC). The results demonstrate the wash fastness of the finishing on the textile samples up to 15 washing cycles and a higher odour reduction rate, demonstrating deodorant properties.

Figure 21:
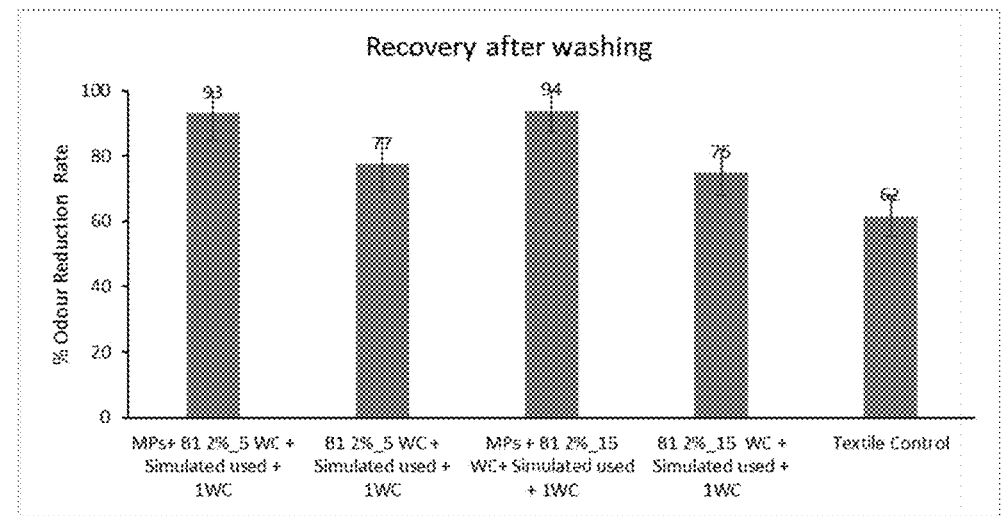
FIG. 21: Schematic representation of odour reduction rate characterization for IVA after usage simulation and one washing cycle.

FIG. 21 shows GC-FID characterization for isovaleric acid (IVA) according ISO 17299-3:2014 adaptation after the textiles were subjected to usage simulation test. Prior to the evaluation of the odour reduction rate, it was put in contact with the sweat odour molecule (IVA) and washed in a domestic laundry machine, with a reference detergent. The textiles regain the deodorant property after the washing.

In order to evaluate the maintenance of the antimicrobial effect of the fabrics, they were subjected to the test according to the standard ISO 20743—Textiles—Determination of antibacterial activity of antibacterial finished products for the bacteria responsible for the degradation of sweat in compounds with unpleasant odours (S. Hominis and S. epidermidis) and two of the bacteria referred to in the standard (S. Aureus and P. innocua). The textiles show ability to inhibit growth of S. hominis, S. aureus and P. innocua, after 24 hours.

TABLE 4

Determination of antibacterial activity of antibacterial finished products (Δlog UFC/ml growth between 0 H and 24 H)

| Strain/Sample | Textile Control | +B1 2% | +MPs + B1 2% |
|---|---|---|---|
| S. aureus | 3.1 | 8.7 | 6.7 |
| S. epidermidis | 4.0 | −0.1 | 1.2 |
| S. hominis | 6.9 | 10.4 | 11.1 |
| P. innocua | 8.6 | 7.6 | 3.4 |

Yarn Coating

In an embodiment, the coating of the yarns was carried out in a wire coating equipment and the coating started, simultaneously, with a yarn speed of 10 m/min, a drying temperature of 110° C., 4 times of the yarn passes through the oven and cure at 150° C.

In an embodiment, the yarn coating formulations were optimized in order to reduce the excess of functional ingredient lost during the washing cycles and mitigate the colour change of the impregnated yarn. In this sense, formulations with 4.5% and 6.5% WPC were developed using binders and stabilizers. In an embodiment, for coating beige yarn 100% cotton 30 Ne was used formulations with 4.5% WPC, 5% Sorbitol (thickener), 20% Resilfix LSK (polyurethane binder) and 0.4% PZ100 (binder catalyst) at the conditions of the yarn coating procedure that have been previously described.

Figure 22:
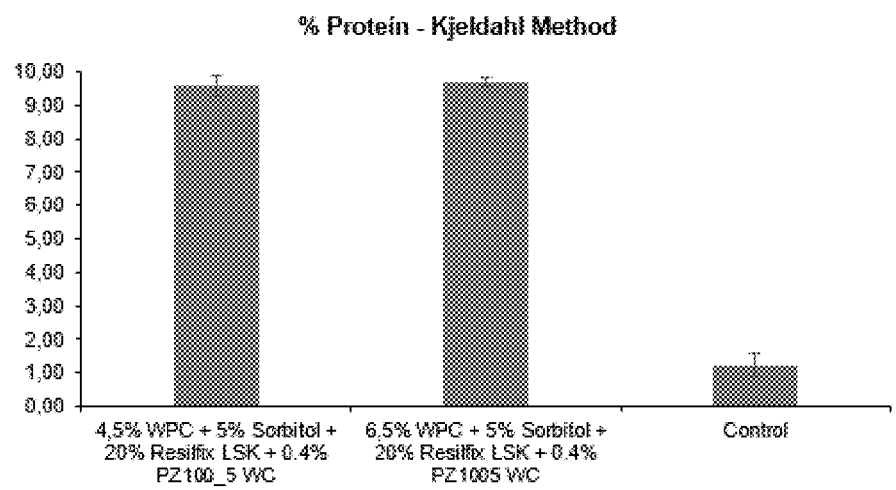
FIG. 22: Schematic representation of protein quantification in yarns by Kjeldahl Method after 5 washing cycles with a reference detergent

In addition, the knitted sample was subjected to 0 and 5 washing cycles to determine its strength. From this study it was found that after 5 washes both formulations have a high percentage of protein compared to the control (FIG. 22). In an embodiment, a viscose rayon web was selected to weave with the following 3 yarns:
 1st Weft: Ne 60/2, 100% cotton, without coating (control);
 2nd Weft: Ne 60/2, 100% cotton, coated with 4.5% WPC+5% Sorbitol+20% Resilfix LSK+0.4% PZ100;
 3rd Weft: Ne 60/2, 100% cotton, coated with 6.5% WPC+5% Sorbitol+20% Resilfix LSK+0.4% PZ10.

Figure 23:
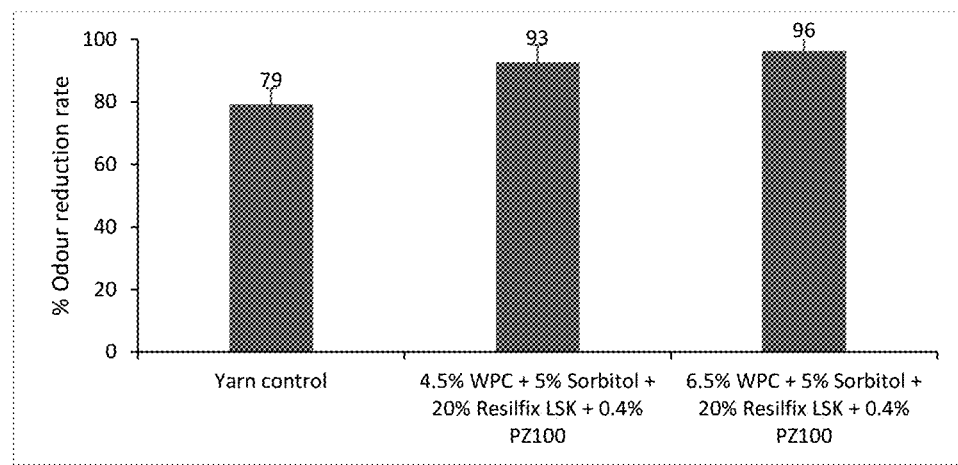
FIG. 23: Schematic representation of odour reduction rate characterization for IVA.

In an embodiment, during weaving, the coated yarns showed a great predisposition to break, which reflects the high friction values already mentioned, resulting in a low weaving performance. In order to evaluate the deodorant properties of these new fabrics with the coated yarns, GC-FID characterization for isovaleric acid (IVA) according ISO 17299-3:2014 adaptation was performed. As shown in FIG. 23, although the yarn control also has a high odour reduction value, there is a slight increase when the protein is introduced into the formulation.

In an embodiment, in order to evaluate the antimicrobial effect of the fabrics, they were subjected to the test according to the standard ISO 20743—Textiles—Determination of antibacterial activity of antibacterial finished products for the bacteria responsible for the degradation of sweat in compounds with unpleasant odours (S. hominis and S. epidermidis) and one of the bacteria referred to in the standard (S. aureus).

The term "comprising" whenever used in this document is intended to indicate the presence of stated features, integers, steps, components, but not to preclude the presence or addition of one or more other features, integers, steps, components or groups thereof.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range.

The disclosure should not be seen in any way restricted to the embodiments described and a person with ordinary skill in the art will foresee many possibilities to modifications thereof.

The above described embodiments are combinable.

The following claims further set out embodiments of the disclosure.

This project has received funding from the European Regional Development Fund through the Operational Program for Competitiveness and Internationalization of PORTUGAL2020 under grant agreement No POCI-01-0247-FEDER-024523.

The invention claimed is:

1. A composition for functionalizing a fabric substrate comprising:
 a whey protein, a whey protein fraction, or a denatured whey protein; as a deodorant agent or as deodorizer agent bound to the fabric substrate;

provided that if the composition comprises whey protein or a whey protein fraction a suitable binder is present; wherein the whey protein is a whey protein isolate, a whey protein concentrate, or mixtures thereof.

2. The composition of claim 1, further comprising a suitable binder, an active substance, or mixtures thereof.

3. The composition of claim 1, wherein the binder is selected from the following list: polyurethane resin, glutaraldehyde, acrylic resin, glyoxal, carboxylic acid, or mixtures thereof, wherein said binder bound the whey protein to the fabric substrate.

4. The composition of claim 2, wherein the active substance is selected from a list consisting of: chitosan, vitamins, essential oils, fragrances, functional additives, or mixtures thereof.

5. The composition of claim 2, wherein the weight ratio between active substance and the whey protein or the whey protein fraction ranges from 1:1-12:1.

6. The composition of claim 2, wherein the whey protein or the whey protein fraction and the active substance form particle aggregates.

7. The composition of claim 6, wherein the size of each particle aggregate ranges from 100-400 nm.

8. The composition of claim 6, wherein the zeta potential value in each particle aggregate ranges from 10-50.

9. The composition of claim 1, further comprising a dye, a thickener, a softener, an essential oil, or combinations thereof.

10. A functionalized fabric comprising the composition of claim 1.

11. The fabric of claim 10, wherein the amount of whey protein or a whey protein fraction per $cm^2$ of fabric ranges from 0.2-3 $mg/cm^2$.

12. The fabric of claim 10, wherein said fabric is a woven fabric, a non-woven fabric, a yarn, a fibre, or a combination thereof.

13. The fabric of claim 12, wherein the fibre is selected from a list consisting of: cotton, polyester, polyamide, viscose, elastane, lyocell, or a mixture thereof.

14. An article comprising the composition of claim 1.

15. A method for producing a fabric comprising the composition of claim 1, wherein the composition is applied on a fabric substrate by a step of: padding, exhaustion, spray coating, doctor blade, or screen printing.

16. The composition of claim 2, wherein the weight ratio between active substance and the whey protein or the whey protein fraction ranges from 2:1-10:1.

17. The fabric of claim 10, wherein the amount of whey protein or a whey protein fraction per $cm^2$ of fabric ranges from 0.3-1.5 $mg/cm^2$.

18. The fabric of claim 10, wherein the amount of whey protein or a whey protein fraction per $cm^2$ of fabric ranges from 0.5-0.9 $mg/cm^2$.

19. The composition of claim 6, wherein the zeta potential value in each particle aggregate ranges from 10-35.

20. The composition of claim 6, wherein the zeta potential value in each particle aggregate ranges from 10-20.

* * * * *